(12) United States Patent
Thelin (10) Patent No.: US 7,436,610 B1
(45) Date of Patent: Oct. 14, 2008

(54) DISK DRIVE EMPLOYING DIFFERENT ZONE BOUNDARIES ACROSS DISK SURFACES

(75) Inventor: Gregory B. Thelin, Garden Grove, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 162 days.

(21) Appl. No.: 11/255,436

(22) Filed: Oct. 20, 2005

(51) Int. Cl.
*G11B 5/09* (2006.01)

(52) U.S. Cl. .............................. 360/48; 360/31; 360/53
(58) Field of Classification Search ........................ None
See application file for complete search history.

(56) References Cited

U.S. PATENT DOCUMENTS

| | | | |
|---|---|---|---|
| 4,750,059 A * | 6/1988 | Syracuse | 360/48 |
| 4,949,036 A | 8/1990 | Bezinque et al. | |
| 5,202,799 A * | 4/1993 | Hetzler et al. | 360/48 |
| 5,446,718 A * | 8/1995 | Shimizu et al. | 369/59.26 |
| 5,487,077 A | 1/1996 | Hassner et al. | |
| 5,596,458 A * | 1/1997 | Emo et al. | 360/48 |
| 5,600,500 A | 2/1997 | Madsen et al. | |
| 5,742,443 A * | 4/1998 | Tsao et al. | 360/50 |
| 5,768,044 A * | 6/1998 | Hetzler et al. | 360/77.08 |
| 5,812,755 A * | 9/1998 | Kool et al. | 714/8 |
| 5,854,778 A * | 12/1998 | Shimizu et al. | 369/59.26 |
| 5,870,237 A | 2/1999 | Emo et al. | |
| 5,872,800 A | 2/1999 | Glover et al. | |
| 5,909,334 A | 6/1999 | Barr et al. | |
| 5,930,358 A | 7/1999 | Rao | |
| 5,941,998 A | 8/1999 | Tillson | |
| 5,949,603 A | 9/1999 | Brown et al. | |
| 6,005,725 A | 12/1999 | Emo et al. | |
| 6,052,804 A | 4/2000 | Thowe et al. | |
| 6,091,559 A | 7/2000 | Emo et al. | |
| 6,105,104 A * | 8/2000 | Guttmann et al. | 711/4 |
| 6,130,796 A | 10/2000 | Wiselogel | |
| 6,137,644 A | 10/2000 | Hetzler et al. | |
| 6,172,839 B1 | 1/2001 | Ahn | |
| 6,181,500 B1 | 1/2001 | Serrano et al. | |
| 6,182,250 B1 | 1/2001 | Ng et al. | |
| 6,195,218 B1 | 2/2001 | Guttmann et al. | |
| 6,256,160 B1 | 7/2001 | Liikanen et al. | |
| 6,266,199 B1 | 7/2001 | Gillis et al. | |
| 6,289,484 B1 | 9/2001 | Rothberg et al. | |
| 6,317,850 B1 | 11/2001 | Rothberg | |
| 6,327,106 B1 | 12/2001 | Rothberg | |
| 6,359,744 B1 | 3/2002 | Mallary | |
| 6,384,999 B1 | 5/2002 | Schibilla | |

(Continued)

*Primary Examiner*—Hoa T. Nguyen
*Assistant Examiner*—Dismery Mercedes
(74) *Attorney, Agent, or Firm*—Howard H. Sheerin, Esq.

(57) ABSTRACT

A disk drive is disclosed comprising a plurality of disk surfaces, including first and second disk surfaces. A first physical zone on a first disk surface has a physical zone boundary at a first predetermined radial location, wherein the first predetermined radial location is different from any of the radial locations of the physical zone boundaries on a second disk surface. A plurality of logical zones are identified having logical zone boundaries defined relative to the physical zone boundaries of at least the first and second disk surfaces, wherein the number of logical zones is greater than the number of physical zones for at least one of the disk surfaces. The logical zones are used to find one of the data sectors corresponding to a block address received from a host.

16 Claims, 6 Drawing Sheets

U.S. PATENT DOCUMENTS

| | | |
|---|---|---|
| 6,393,511 B1 | 5/2002 | Albrecht et al. |
| 6,396,654 B2 | 5/2002 | Jeong et al. |
| 6,429,984 B1 | 8/2002 | Alex |
| 6,441,981 B1 * | 8/2002 | Cloke et al. .................. 360/51 |
| 6,466,387 B1 | 10/2002 | Ogasawara et al. |
| 6,490,111 B1 | 12/2002 | Sacks |
| 6,493,176 B1 | 12/2002 | Deng et al. |
| 6,560,052 B2 | 5/2003 | Ng et al. |
| 6,603,617 B1 | 8/2003 | Cross |
| 6,606,211 B1 | 8/2003 | Lim et al. |
| 6,628,466 B2 | 9/2003 | Alex |
| 6,650,492 B2 | 11/2003 | Lenny et al. |
| 6,691,255 B1 | 2/2004 | Rothberg et al. |
| 6,693,766 B1 * | 2/2004 | Wilkes et al. ............ 360/78.08 |
| 6,697,203 B1 | 2/2004 | Cheng et al. |
| 6,714,368 B1 | 3/2004 | Himle et al. |
| 6,747,827 B1 | 6/2004 | Bassett et al. |
| 6,763,430 B1 * | 7/2004 | Camp .................... 711/112 |
| 6,781,780 B1 | 8/2004 | Codilian |
| 6,791,775 B2 | 9/2004 | Li et al. |
| 6,798,591 B2 | 9/2004 | Barnett et al. |
| 6,809,893 B2 | 10/2004 | Uzumaki et al. |
| 6,826,007 B1 | 11/2004 | Patton, III |
| 6,854,022 B1 | 2/2005 | Thelin |
| 6,854,071 B2 | 2/2005 | King et al. |
| 6,862,505 B2 | 3/2005 | Satoh et al. |
| 6,892,249 B1 | 5/2005 | Codilian et al. |
| 6,895,500 B1 | 5/2005 | Rothberg |
| 6,898,033 B2 | 5/2005 | Weinstein et al. |
| 6,947,234 B2 | 9/2005 | Lamberts et al. |
| 6,950,967 B1 | 9/2005 | Brunnett et al. |
| 6,982,842 B2 | 1/2006 | Jing et al. |
| 6,987,630 B1 | 1/2006 | Higgins et al. |
| 6,993,678 B2 * | 1/2006 | Cheok et al. .................. 714/8 |
| 6,995,933 B1 | 2/2006 | Codilian et al. |
| 7,006,321 B2 | 2/2006 | Kisaka |
| 7,024,614 B1 | 4/2006 | Thelin et al. |
| 7,032,127 B1 | 4/2006 | Egan et al. |
| 7,050,252 B1 | 5/2006 | Vallis |
| 7,076,603 B1 * | 7/2006 | Chheda .................. 711/111 |
| 7,076,604 B1 | 7/2006 | Thelin |
| 7,082,494 B1 | 7/2006 | Thelin et al. |
| 7,120,737 B1 | 10/2006 | Thelin |
| 7,143,203 B1 | 11/2006 | Altmejd |
| 7,173,782 B2 | 2/2007 | Ikeda et al. |
| 2001/0036133 A1 * | 11/2001 | Nagata et al. .................. 369/32 |
| 2002/0039246 A1 | 4/2002 | Ding et al. |
| 2002/0141099 A1 * | 10/2002 | Ng et al. .................. 360/75 |
| 2003/0007269 A1 | 1/2003 | Alex |
| 2003/0016461 A1 | 1/2003 | Seng et al. |
| 2003/0065872 A1 * | 4/2003 | Edgar et al. .................. 711/4 |
| 2003/0221055 A1 * | 11/2003 | Okada .................. 711/113 |
| 2004/0136104 A1 | 7/2004 | Chiao et al. |
| 2004/0153949 A1 | 8/2004 | Ro et al. |
| 2004/0174627 A1 | 9/2004 | Kim et al. |
| 2004/0179292 A1 | 9/2004 | Zayas et al. |
| 2004/0268033 A1 | 12/2004 | Chia et al. |
| 2005/0036437 A1 | 2/2005 | Learned et al. |
| 2005/0078393 A1 | 4/2005 | Cho |
| 2005/0146803 A1 | 7/2005 | Kim et al. |
| 2005/0188153 A1 | 8/2005 | Yun et al. |
| 2005/0207049 A1 | 9/2005 | Ikeda et al. |
| 2006/0066971 A1 | 3/2006 | Alex et al. |
| 2006/0098318 A1 | 5/2006 | Feng |
| 2006/0101197 A1 | 5/2006 | Georgis et al. |
| 2006/0132954 A1 | 6/2006 | Wada et al. |

* cited by examiner

DISK DRIVE EMPLOYING DIFFERENT ZONE BOUNDARIES ACROSS DISK SURFACES

BACKGROUND OF THE INVENTION

1. Field of the Invention

The present invention relates to disk drives for computer systems. More particularly, the present invention relates to a disk drive employing different zone boundaries across disk surfaces.

2. Description of the Prior Art

Prior art disk drives employ one or more disks with heads actuated over the respective disk surfaces (e.g., top and bottom surfaces). Each disk surface comprises a plurality of radially spaced, concentric data tracks, wherein each data track comprises a number of data sectors for storing user data. During write operations, the disk drive receives user data and a logical block address (LBA) which is mapped to an absolute block address (ABA) identifying one of the data sectors for storing the user data. The LBA to ABA mapping enables defective data sectors to be mapped to spare data sectors.

Figure 1:
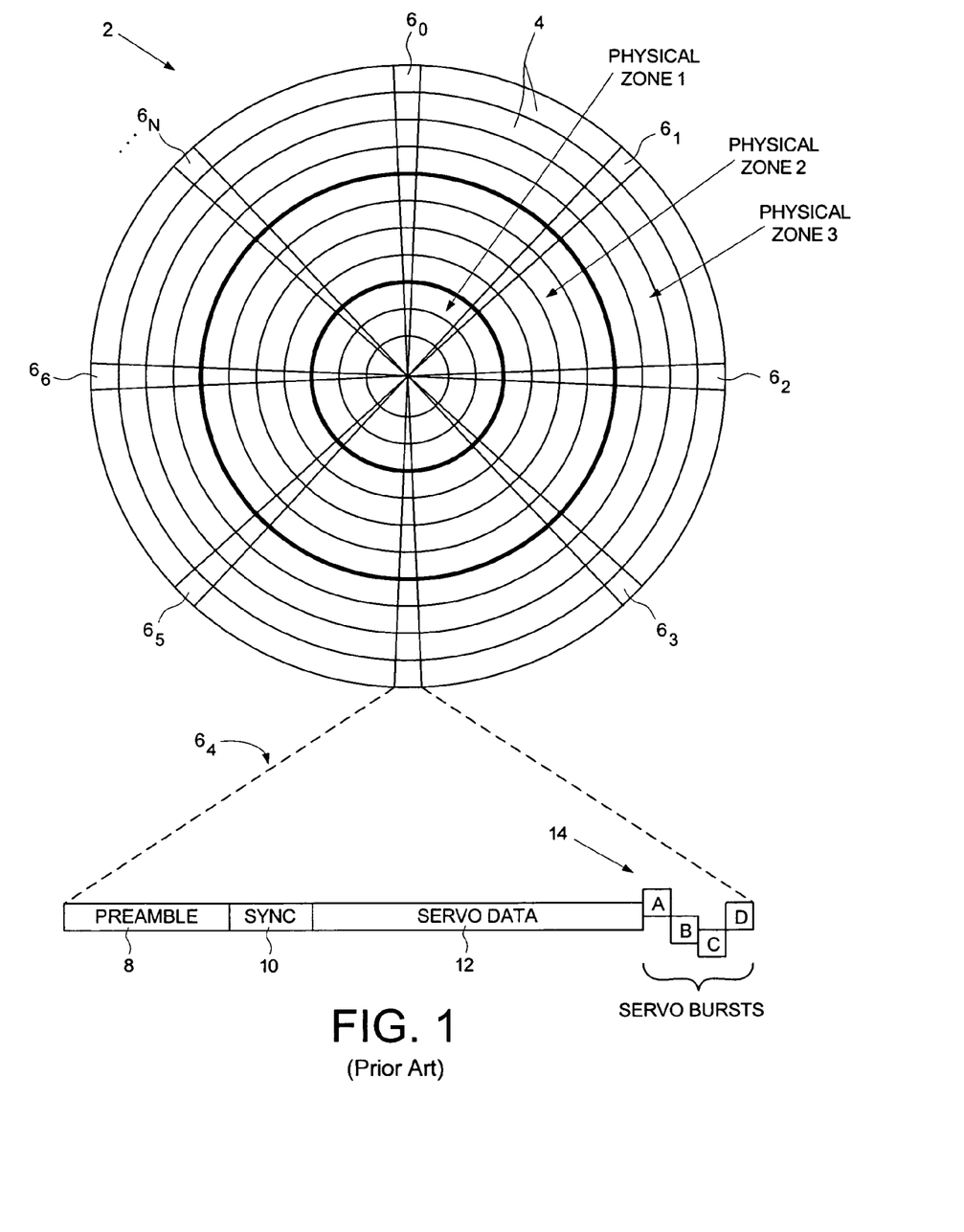
FIG. 1 shows a prior art disk format comprising a plurality of concentric data tracks that are banded together to form a plurality of physical zones.

Because the disk is rotated at a constant velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3). The prior art disk format of FIG. 1 also comprises a number of embedded servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6; further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

Prior art disk drives typically configure the physical zones so that the zone boundaries occur at the same radial locations across all disk surfaces. However, a recent development is to optimize the size of each physical zone relative to the characteristics of each head/disk interface. In addition, the linear bit density as well as the tracks-per-inch (TPI) may be optimized for each disk surface, which can also cause the size of the physical zones (and corresponding physical zone boundaries) to differ across the disk surfaces. When the physical zone boundaries are different across the disk surfaces, a problem arises in locating the appropriate data sector corresponding to a given ABA. In other words, allowing the physical zone boundaries to vary across disk surfaces complicates the process of mapping an ABA to the corresponding physical zone, head, and data track.

There is, therefore, a need to simplify the ABA to zone/head/track mapping in a disk drive wherein the zone boundaries vary across the disk surfaces.

SUMMARY OF THE INVENTION

An embodiment of the present invention comprises a disk drive having a plurality of disk surfaces. Each disk surface comprises a plurality of data tracks, wherein each data track comprises a plurality of data sectors. The data tracks of each disk surface are banded together into a plurality of physical zones each having physical zone boundaries at predetermined radial locations on the disk surface, wherein each physical zone operable to store data in the data sectors at a predetermined data rate. A first physical zone on a first disk surface has a physical zone boundary at a first predetermined radial location, wherein the first predetermined radial location is different from any of the radial locations of the physical zone boundaries on a second disk surface. The disk drive further comprises control circuitry operable to identify a plurality of logical zones having logical zone boundaries defined relative to the physical zone boundaries of at least the first and second disk surfaces, wherein the number of logical zones is greater than the number of physical zones for at least one of the disk surfaces. The logical zones are used to find one of the data sectors corresponding to a block address received from a host.

In one embodiment, the disk drive further comprises a plurality of heads actuated over respective disk surfaces, and the data sector corresponding to the block address is located by finding the logical zone corresponding to the block address, finding the head within the logical zone corresponding to the block address, and finding the data track corresponding to the head and block address.

In another embodiment, the data sectors of one of the physical zones on a first disk surface store data at a first data rate, and the data-sectors of a corresponding physical zone on a second disk surface store data at a second data rate different than the first data rate.

In yet another embodiment, the data tracks on a first disk surface comprise a first radial density, and the data tracks on a second disk surface comprise a second radial density different than the first radial density.

In still another embodiment, each disk surface comprises a plurality of servo tracks, and on at least one of the disk surfaces the radial density of the data tracks is different than the radial density of the servo tracks. In one embodiment, the control circuitry is further operable to identify a plurality of clusters, wherein each cluster comprises a first number of servo tracks and a second number of data tracks, and the first number of servo tracks is different than the second number of data tracks. In one embodiment, the control circuitry is further operable to find the data sector corresponding to the block address by finding the logical zone corresponding to the block address, finding the cluster within the logical zone corresponding to the block address, finding the head within the cluster corresponding to the block address, and finding the data track corresponding to the head and block address. In yet another embodiment, the control circuitry is further operable to find the data sector corresponding to the block address by finding the servo track and a radial offset from the servo track that correspond to the data track.

Another embodiment of the present invention comprises a method of mapping a block address received from a host to a data sector in a disk drive, the disk drive comprising a plurality of disk surfaces. Each disk surface comprises a plurality of data tracks, wherein each data track comprises a plurality of data sectors. The data tracks of each disk surface are banded together into a plurality of physical zones each having physical zone boundaries at predetermined radial locations on the disk surface, wherein each physical zone operable to store data in the data sectors at a predetermined data rate. A first physical zone on a first disk surface has a physical zone boundary at a first predetermined radial location, wherein the first predetermined radial location is different from any of the radial locations of the physical zone boundaries on a second disk surface. The method comprises the steps of identifying a plurality of logical zones having logical zone boundaries defined relative to the physical zone boundaries of at least the first and second disk surfaces, wherein the number of logical zones is greater than the number of physical zones for at least one of the disk surfaces. The logical zones are used to find one of the data sectors corresponding to the block address received from the host.

DESCRIPTION OF THE PREFERRED EMBODIMENTS

Figure 2A:
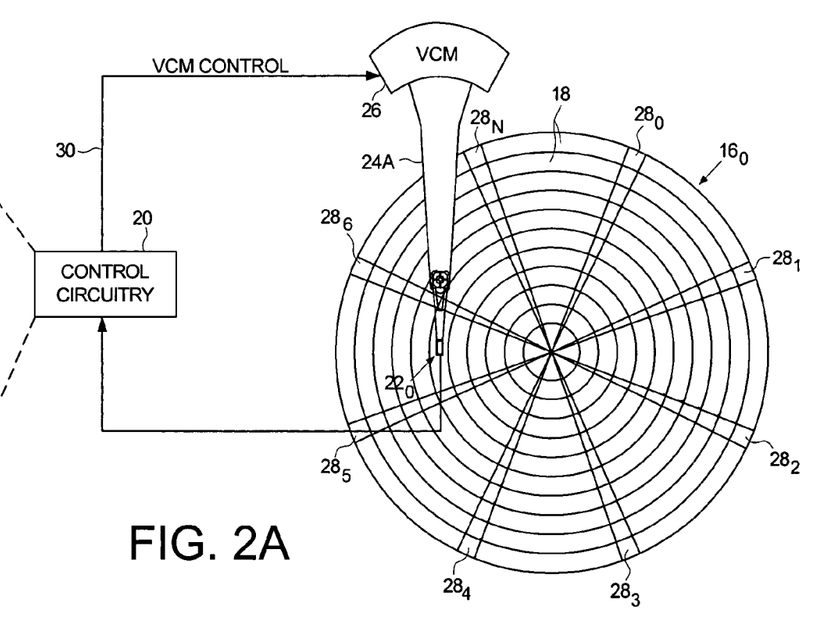
FIGS. 2A and 2B show a disk drive according to an embodiment of the present invention comprising a plurality of disk surfaces and heads actuated over respective disk surfaces.
Figure 2B:
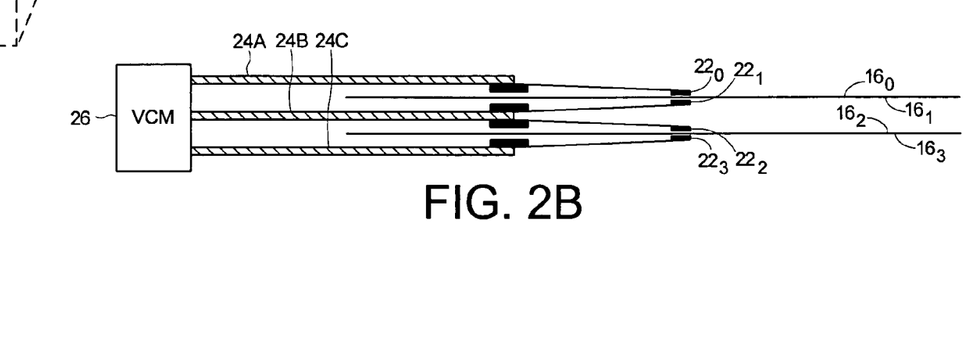

FIGS. 2A and 2B show a disk drive according to an embodiment of the present invention having a plurality of disk surfaces ($16_0$-$16_3$). Each disk surface (e.g., disk surface $16_0$) comprises a plurality of data tracks 18, wherein each data track comprises a plurality of data sectors. The data tracks 18 of each disk surface are banded together into a plurality of physical zones each having physical zone boundaries at predetermined radial locations on the disk surface, wherein each physical zone is operable to store data in the data sectors at a predetermined data rate. A first physical zone on a first disk surface has a physical zone boundary at a first predetermined radial location, wherein the first predetermined radial location is different from any of the radial locations of the physical zone boundaries on a second disk surface. The disk drive further comprises control circuitry 20 operable to identify a plurality of logical zones having logical zone boundaries defined relative to the physical zone boundaries of at least the first and second disk surfaces, wherein the number of logical zones is greater than the number of physical zones for at least one of the disk surfaces. The logical zones are used to find one of the data sectors corresponding to a block address received from a host.

In the embodiment of FIGS. 2A and 2B, the disk drive comprises a plurality of heads ($22_0$-$22_3$) actuated over respective disk surfaces ($16_0$-$16_3$). The heads ($22_0$-$22_3$) are attached to the distal ends of actuator arms (24A-24C) which are rotated about a pivot by a voice coil motor (VCM) 26 in order to position the heads ($22_0$-$22_3$) over the disk surfaces ($16_0$-$16_3$). Each disk surface ($16_0$-$16_3$) comprises a number of servo sectors ($28_0$-$28_N$) that store coarse head position information (e.g., a track address) used to position the head over a target data track during a seek operation, and fine head position information (e.g., servo bursts) used to maintain the head over the target data track during read/write operations. The control circuitry 20 processes the servo sectors ($28_0$-$28_N$) to generate a VCM control signal 30 applied to the VCM 26 in a closed loop servo system.

Figure 2C:
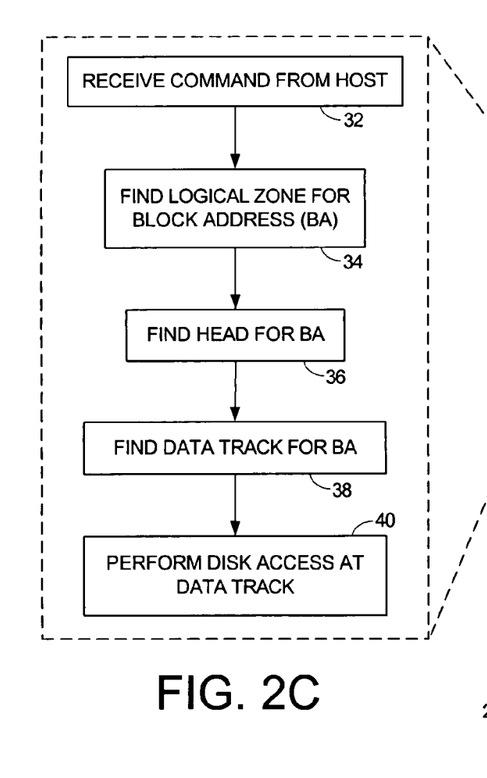
FIG. 2C is a flow diagram executed by the control circuitry of FIG. 2A for mapping a block address received from a host to a data sector on a disk surface using a plurality of logical zones.

FIG. 2C shows a flow diagram executed by the control circuitry 20 for finding a data sector corresponding to a block address received from a host using the logical zones. At step 32 an access command is received from a host including a block address associated with a read/write command. At step 34 the logical zone corresponding to the block address is located, at step 36 the head corresponding to the block address is located, and at step 38 the data track corresponding to the block address is located. At step 40 the control circuitry 20 executes the disk access command at the target data sector within the target data track.

Any suitable control circuitry 20 may be employed in the embodiments of the present invention. In one embodiment, the control circuitry 20 comprises a microprocessor executing instructions, the instructions being operable to cause the microprocessor to perform the steps of FIG. 2C as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk and read into a volatile semiconductor memory when the disk drive is powered on. In yet another embodiment, the control circuitry 20 comprises suitable logic circuitry, such as state machine circuitry.

Figure 4:
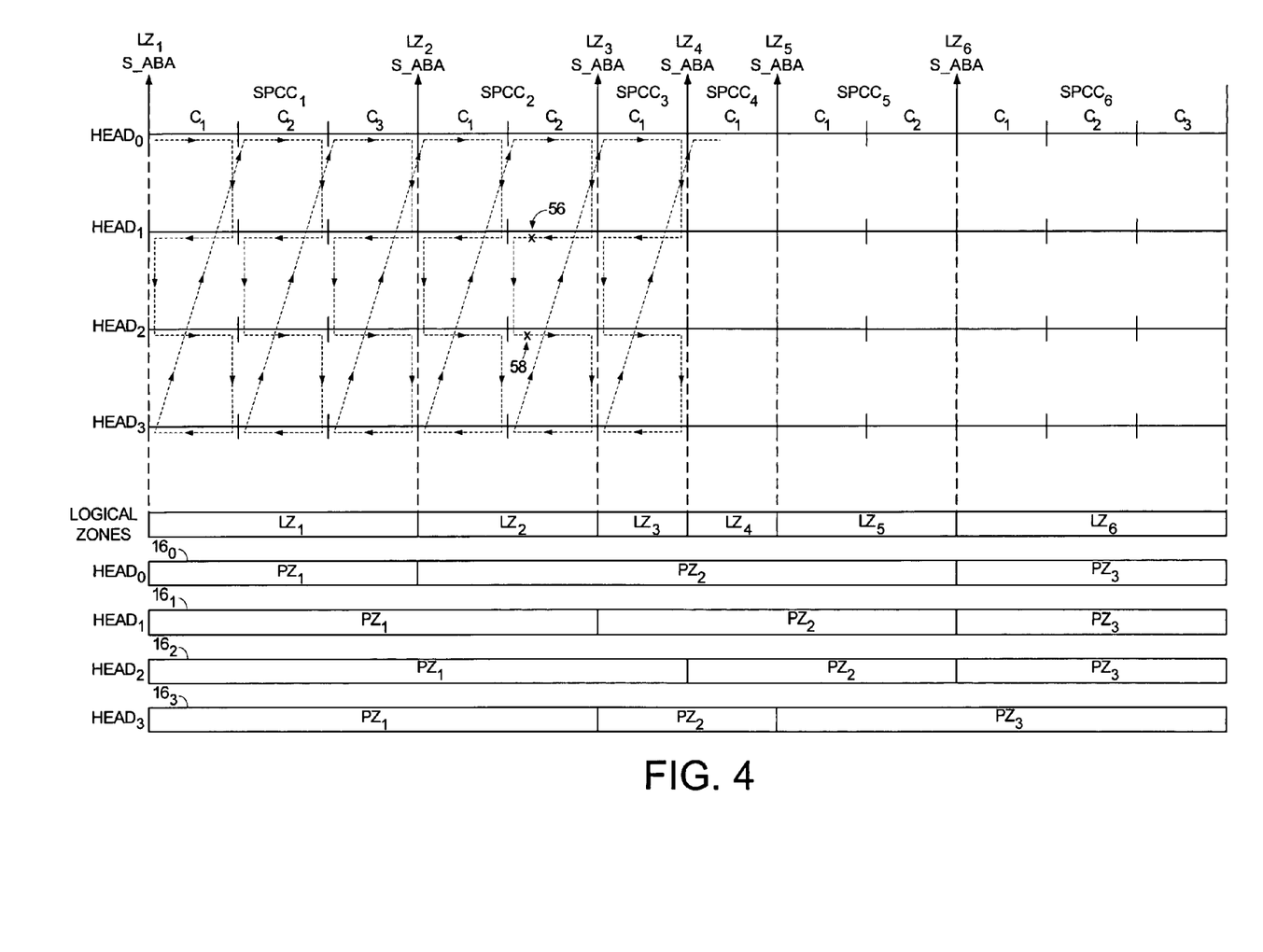
FIG. 4 shows an embodiment of the present invention wherein the physical zone boundaries define the logical zone boundaries, and the numbering for the absolute block addresses follows a serpentine pattern along the width of a cluster.

FIG. 4 shows an example format for the disk surfaces ($16_0$-$16_3$) according to an embodiment of the present invention. In this example, each disk surface corresponding to heads $22_0$-$22_3$ comprises three physical zones $PZ_1$-$PZ_3$ having physical zone boundaries at predetermined radial locations. The physical zone $PZ_1$ on disk surface $16_0$ has a physical zone boundary (right boundary) at a first predetermined radial location, wherein the first predetermined radial location is different from any of the radial locations of the physical zone boundaries on disk surface $16_1$. The physical zone $PZ_1$ on the disk surface $16_1$ has a physical zone boundary (right boundary) at a second predetermined radial location, wherein the second predetermined radial location is different from any of the radial locations of the physical zone boundaries on disk surface $16_0$. The logical zone boundaries of logical zones $LZ_1$-$LZ_6$ are defined relative to the physical zone boundaries in that a new logical zone boundary occurs whenever there is a change in any one of the physical zones on any disk surface. Accordingly, in this embodiment the number of logical zones is greater than the number of physical zones for at least one of the disk surfaces (six logical zones and three physical zones in the example of FIG. 4). Preferably, these logical zones are defined for at least two of the disk surfaces, and in one embodiment, one set of logical zones defines the logical zone boundaries for the entire drive.

In one embodiment, the data sectors of one of the physical zones on a first disk surface (e.g., $PZ_1$ on disk surface 16$_0$) store data at a first data rate, and the data sectors of a corresponding physical zone on a second disk surface (e.g., $PZ_1$ on disk surface 16$_1$) store data at a second data rate different than the first data rate. Corresponding means $PZ_1$ on disk surface 16$_0$ corresponds to $PZ_1$ on disk surface 16$_1$ regardless of their vertical alignment. In yet another embodiment, the data tracks on a first disk surface (e.g., disk surface 16$_0$) comprise a first radial density, and the data tracks on a second disk surface (e.g., disk surface 16$_1$) comprise a second radial density different than the first radial density.

Figure 3:
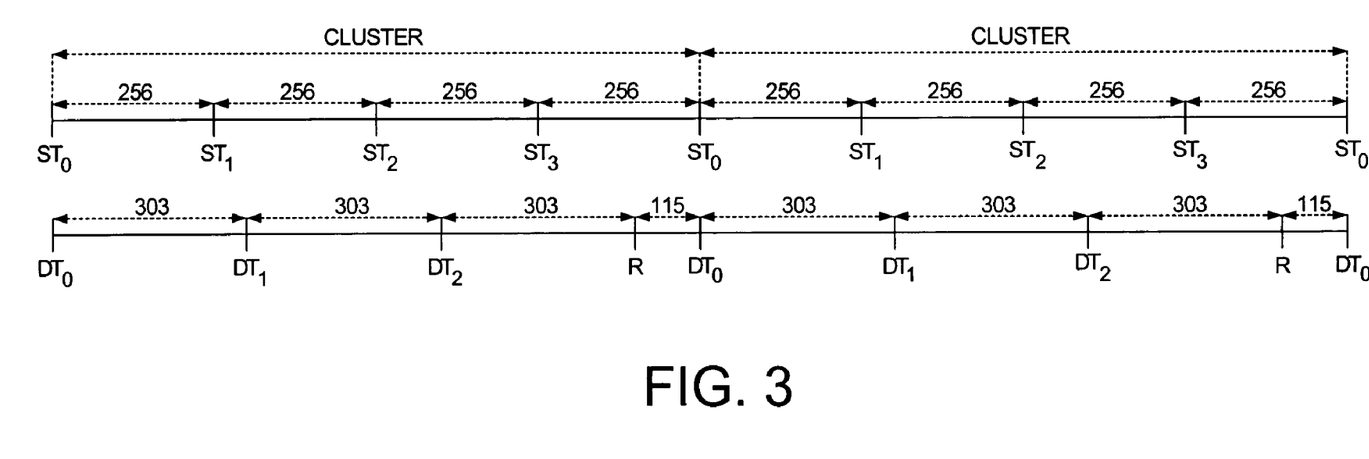
FIG. 3 shows an embodiment of the present invention wherein the control circuitry identifies a number of clusters, wherein each cluster comprises a first number of servo tracks and a second number of data tracks, and the first number of servo tracks is different than the second number of data tracks.

In still another embodiment, each disk surface comprises a plurality of servo tracks, and on at least one of the disk surfaces the radial density of the data tracks is different than the radial density of the servo tracks. This embodiment is illustrated in FIG. 3 which shows the format of servo tracks (ST) relative to the format of data tracks (DT). In this example, there are 256 quantized steps between the centerline of each servo track, and 303 quantized steps between the centerline of each data track. Therefore, the ratio of the radial density of servo tracks to data tracks is 256/303. Any suitable ratio of servo track density to data track density may be employed in the embodiments of the present invention.

In one embodiment, the control circuitry 20 is further operable to identify a plurality of clusters, wherein each cluster comprises a first number of servo tracks and a second number of data tracks, and the first number of servo tracks is different than the second number of data tracks. This embodiment is also illustrated in FIG. 3, wherein in this example each cluster comprises 4 full servo tracks $ST_0$-$ST_3$ (4×256=1024 steps) and 3 full data tracks $DT_0$-$DT_2$ (with a remainder of 115 steps as shown). In this embodiment, each cluster comprises an integer number of servo track spacings and a fractional number of data track spacings. Also in this embodiment, the data tracks are formatted such that the spacing of data tracks always begins relative to the start of a new cluster. In the example of FIG. 3, the spacing between the last data track (data track $DT_2$) of a current cluster and the first data track (data track $DT_0$) of the next cluster includes the remainder (303+115=418 steps). In an alternative embodiment, the remainder is distributed across the data tracks in any suitable manner so that the spacing between data tracks is substantially even.

Any suitable radial density may be selected for the data tracks in step increments, with the minimum distance between data tracks being the distance between servo tracks (256 steps). This allows the data track density (tracks per inch) as well as the linear density (bits per inch) to be optimized for each head/surface, while enabling a convenient mapping of host block addresses to target data sectors.

In one embodiment, the block address received from the host is a logical block address (LBA) that the control circuitry 20 maps to an absolute block address (ABA) corresponding to a target data sector. This LBA to ABA mapping facilitates the "mapping out" of defective data sectors to spare data sectors. Any suitable LBA to ABA mapping algorithm may be employed in the embodiments of the present invention.

In one embodiment, the ABA numbering follows a suitable serpentine pattern across the disk surfaces. This is illustrated in the embodiment of FIG. 4, wherein the serpentine pattern follows the width of a cluster along a current surface of a disk in one direction (e.g., OD to ID), and then follows along a cluster width of a next disk surface in the opposite direction (e.g., ID to OD). When the end of the cluster on the last disk surface is reached, the serpentine pattern continues starting with the next cluster on the first disk surface as illustrated in FIG. 4.

Figure 5:
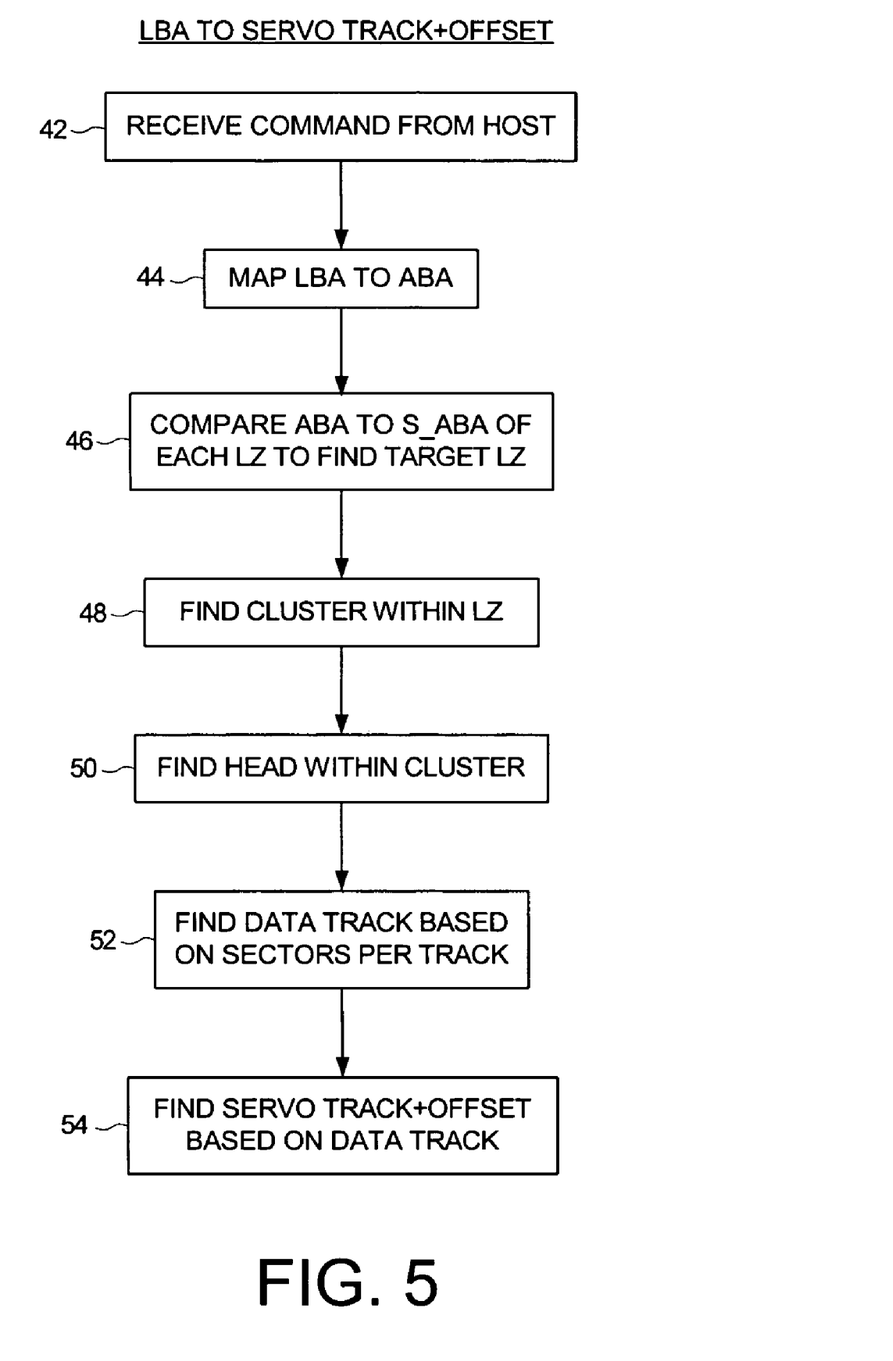
FIG. 5 shows a flow diagram according to an embodiment of the present invention for finding a data sector on a disk surface in response to a block address received from the host by finding the corresponding logical zone, the cluster within the logical zone, the head within the cluster, the data track for the head, and the servo track and servo track offset for the head.

Note that because the physical zones do not change within a logical zone, the sectors per cluster cylinder (SPCC) are the same within each logical zone, wherein the SPCC is the number of sectors on all of the disk surfaces within the cluster cylinder. This is true even though the data track density and the linear bit density may be different across the disk surfaces. This constraint enables the convenient mapping of an ABA to a target data sector, which is understood with reference to the flow diagram of FIG. 5:

Step 42: Receive access command from host—An access command is received from a host, including a logical block address.

Step 44: Map LBA to ABA—The LBA received from the host is mapped to an ABA using any suitable algorithm.

Step 46: Find the logical zone corresponding to the ABA—Each logical zone has an associated starting ABA (S_ABA), which is computed as the SPCC times the number of clusters within each preceding zone. The logical zone corresponding to any given ABA is found by comparing the starting ABA of each logical zone to the target ABA.

Step 48: Find the cluster within the logical zone corresponding to the ABA—The cluster within the target logical zone is then found by comparing the target ABA to the SPCC for each cluster. For example, the control circuitry may be operable to subtract the starting ABA of the target logical zone from the target ABA to find the remainder, and then subtract the SPCC from the remainder repetitively until the result is less than the SPCC. The fractional SPCC is then used to find the target head/surface in the next step.

Step 50: Find the head within the cluster corresponding to the ABA—Once the cluster within the logical zone is found, the head/surface storing the target data sector is found by comparing the fractional SPCC to the sectors per cluster (SPC) for each disk surface starting with the first disk surface 16$_0$. For example, the control circuitry may be operable to subtract the SPC for each disk surface from the fractional SPCC found in the previous step until the result is less than the SPC. The remainder of this step is then used to find the target data track in the next step.

Step 52: Find the data track corresponding to the head and ABA—The target data track is then found by comparing the remainder of the previous step to the sectors per track (SPT) within the cluster on the target disk surface. For example, subtract the sectors per track from the remainder of the previous step until the result is less than the SPT.

Step 54: Find the servo track and a radial offset—Once the target data track is known, the corresponding servo track can be determined using the ratio of servo track density to data track density. The centerline of the target data track is typically located at a radial offset (in steps) from the target servo track. In one embodiment, the target servo track and radial offset are always determined relative to the left side of the cluster regardless as to the serpentine direction.

Figure 6A:
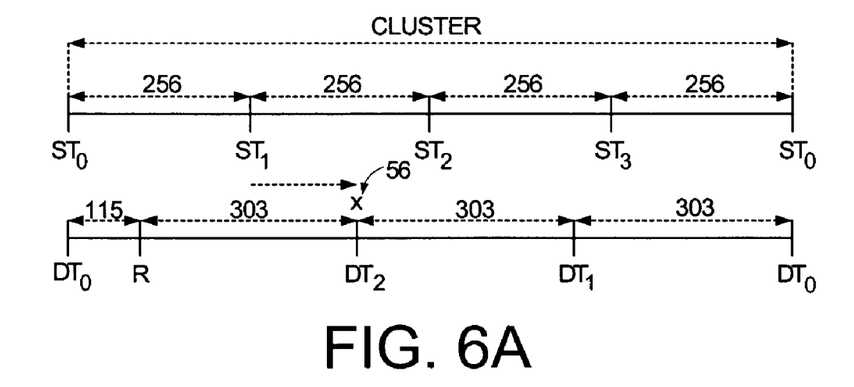
FIGS. 6A and 6B illustrate how a servo track and servo track offset are identified for locating the center of a target data track according to an embodiment of the present invention.

A better understanding of how an ABA is mapped to a target data sector is understood by considering two examples in FIG. 4, assuming the following format parameters:

$SPCC_1=412 \Rightarrow S\_ABA\ LZ_2=1236$ $SPCC_2=466 \Rightarrow S\_ABA\ LZ_3=2168$ SPC within cluster $C_2$ of $LZ_2$ on disk surface $16_0=124$ SPC within cluster $C_2$ of $LZ_2$ on disk surface $16_1=105$ SPC within cluster $C_2$ of $LZ_2$ on disk surface $16_2=90$ SPC within cluster $C_2$ of $LZ_2$ on disk surface $16_3=147$ SPT within cluster $C_2$ of $LZ_2$ on disk surface $16_1=35$ SPT within cluster $C_2$ of $LZ_2$ on disk surface $16_2=30$ In a first example illustrated in FIG. 6A, a target data sector (reference number 56 in FIG. 4) is found for ABA number 1897. The target logical zone ($LZ_2$) is found by comparing the S_ABA of the logical zones to the target ABA of 1897. A remainder is found by subtracting the S_ABA of the target logical zone (S_ABA $LZ_2=1236$) from the ABA number 1897 leaving a remainder of 661. The target cluster within $LZ_2$ is then found by subtracting the $SPCC_2$ from the remainder of 661 (which happens once in this case before the result is less than $SPCC_2$). The remainder (661−466=195) is then used to find the target head/surface by subtracting the SPC for each disk surface (which happens once in this case before the result is less than the SPC). The remainder (195−124=71) represents the sector number within cluster $C_2$ of $LZ_2$ on disk surface $16_1$. The corresponding target data track and target data sector are then found by subtracting the sectors per track (SPT) within cluster $C_2$ of $LZ_2$ on disk surface $16_1$ (71−35−35=1). Therefore, the target data sector is the second data sector of the third data track (data track $DT_2$ counting from right to left in FIG. 6A) within cluster $C_2$ of $LZ_2$ on disk surface $16_1$. The corresponding servo track and radial offset is then found using the ratio of servo track density to data track density (256/303):

Target servo track=((4×256)−(2×303))/256=1 remainder 162.

In the above equation, the number of steps in two data track spacings (2×303) is subtracted from the total number of steps in the cluster (4×256) since the direction of the serpentine pattern is right to left for disk surface $16_1$. Therefore, the target servo track is the second servo track (servo track $ST_1$ counting from left to right in FIG. 6A) within cluster $C_2$ of $LZ_2$ on disk surface $16_1$, and the radial offset from the second servo track is 162 steps as shown in FIG. 6A.

Figure 6B:
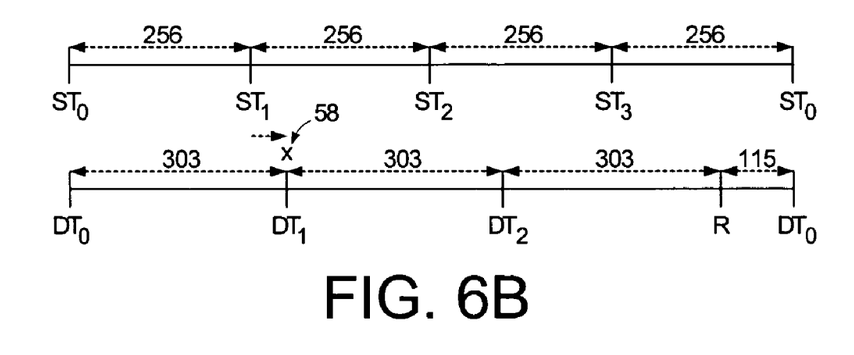

In a second example illustrated in FIG. 6B, the target data sector (reference number 58 in FIG. 4) is found for ABA number 1967. The target logical zone ($LZ_2$) is found by comparing the S_ABA of the logical zones to the target ABA of 1967. A remainder is found by subtracting the S_ABA of the target logical zone (S_ABA $LZ_2=1236$) from the ABA number 1967 leaving a remainder of 731. The target cluster within $LZ_2$ is then found by subtracting the $SPCC_2$ from the remainder of 731 (which happens once in this case before the result is less than $SPCC_2$). The remainder (731−466=265) is then used to find the target head/surface by subtracting the SPC for each disk surface (which happens twice in this case before the result is less than the SPC). The remainder (265−124−105=36) represents the sector number within cluster $C_2$ of $LZ_2$ on disk surface $16_2$. The corresponding target data track and target data sector are then found by subtracting the sectors per track (SPT) within cluster $C_2$ of $LZ_2$ on disk surface $16_2$ (36−30=6). Therefore, the target data sector is the 7th data sector of the second data track (data track $DT_1$ counting from left to right in FIG. 6B) within cluster $C_2$ of $LZ_2$ on disk surface $16_2$. The corresponding servo track and radial offset is then found using the ratio of servo track density to data track density (256/303):

Target servo track=(1×303)/256=1 remainder 47.

Therefore, the target servo track is the second servo track (servo track $ST_1$ counting from left to right in FIG. 6B) within cluster $C_2$ of $LZ_2$ on disk surface $16_2$, and the radial offset from the second servo track is 47 steps as shown in FIG. 6B.

In one embodiment, the parameters needed to map a given ABA to a target data sector are stored in a table. For example, the starting ABA for each logical zone, the SPCC for each logical zone, the SPC within each logical zone on each disk surface, and the SPT for each cluster on each disk surface are stored in a table, wherein the appropriate table values are retrieved at each step in the above mapping process.

I claim:

1. A disk drive comprising:
   (a) a plurality of disk surfaces, wherein:
      each disk surface comprises a plurality of data tracks;
      each data track comprises a plurality of data sectors;
      the data tracks of each disk surface are banded together into a plurality of physical zones each having physical zone boundaries at predetermined radial locations on the disk surface, wherein each physical zone is operable to store data in the data sectors at a predetermined data rate; and
      a first physical zone on a first disk surface has a physical zone boundary at a first predetermined radial location, wherein the first predetermined radial location is different from any of the radial locations of the physical zone boundaries on a second disk surface; and
   (b) control circuitry operable to:
      identify a plurality of logical zones, wherein at least one logical zone has logical zone boundaries defined relative to the physical zone boundaries of at least the first and second disk surfaces, and the number of logical zones is greater than the number of physical zones for at least one of the disk surfaces; and
      use the logical zones to find one of the data sectors corresponding to a block address received from a host.

2. The disk drive as recited in claim 1, wherein the disk drive further comprises a plurality of heads actuated over respective disk surfaces, and the control circuitry is further operable to find the data sector corresponding to the block address by:
   finding the logical zone corresponding to the block address;
   finding the head within the logical zone corresponding to the block address; and
   finding the data track corresponding to the head and block address.

3. The disk drive as recited in claim 1, wherein:
   the data sectors of one of the physical zones on the first disk surface store data at a first data rate; and
   the data sectors of a corresponding physical zone on the second disk surface store data at a second data rate different than the first data rate.

4. The disk drive as recited in claim 1, wherein:
the data tracks on the first disk surface comprise a first radial density; and
the data tracks on the second disk surface comprise a second radial density different than the first radial density.

5. The disk drive as recited in claim 1, wherein:
each disk surface comprises a plurality of servo tracks; and
on at least one of the disk surfaces the radial density of the data tracks is different than the radial density of the servo tracks.

6. The disk drive as recited in claim 5, wherein the control circuitry is further operable to identify a plurality of clusters, wherein:
each cluster comprises a first number of servo tracks and a second number of data tracks; and
the first number of servo tracks is different than the second number of data tracks.

7. The disk drive as recited in claim 6, wherein the control circuitry is further operable to find the data sector corresponding to the block address by:
finding the logical zone corresponding to the block address;
finding the cluster within the logical zone corresponding to the block address;
finding the head within the cluster corresponding to the block address; and
finding the data track corresponding to the head and block address.

8. The disk drive as recited in claim 7, wherein the control circuitry is further operable to find the data sector corresponding to the block address by finding the servo track and a radial offset from the servo track that correspond to the data track.

9. A method of mapping a block address received from a host to a data sector in a disk drive, the disk drive comprising a plurality of disk surfaces, wherein:
each disk surface comprises a plurality of data tracks;
each data track comprises a plurality of data sectors;
the data tracks of each disk surface are banded together into a plurality of physical zones each having physical zone boundaries at predetermined radial locations on the disk surface, wherein each physical zone is operable to store data in the data sectors at a predetermined data rate; and
a first physical zone on a first disk surface has a physical zone boundary at a first predetermined radial location, wherein the first predetermined radial location is different from any of the radial locations of the physical zone boundaries on a second disk surface;
the method comprising the steps of:
identifying a plurality of logical zones, wherein at least one logical zone has logical zone boundaries defined relative to the physical zone boundaries of at least the first and second disk surfaces, and the number of logical zones is greater than the number of physical zones for at least one of the disk surfaces; and
using the logical zones to find one of the data sectors corresponding to the block address received from the host.

10. The method as recited in claim 9, wherein the disk drive further comprises a plurality of heads actuated over respective disk surfaces, and the step of using the logical zones to find one of the data sectors corresponding to the block address comprises the steps of:
finding the logical zone corresponding to the block address;
finding the head within the logical zone corresponding to the block address; and
finding the data track corresponding to the head and block address.

11. The method as recited in claim 9, wherein:
the data sectors of one of the physical zones on a first disk surface store data at a first data rate; and
the data sectors of a corresponding physical zone on a second disk surface store data at a second data rate different than the first data rate.

12. The method as recited in claim 9, wherein:
the data tracks on a first disk surface comprise a first radial density; and
the data tracks on a second disk surface comprise a second radial density different than the first radial density.

13. The method as recited in claim 9, wherein:
each disk surface comprises a plurality of servo tracks; and
on at least one of the disk surfaces the radial density of the data tracks is different than radial density of the servo tracks.

14. The method as recited in claim 13, further comprising the step of identifying a plurality of clusters, wherein:
each cluster comprises a first number of servo tracks and a second number of data tracks; and
the first number of servo tracks is different than the second number of data tracks.

15. The method as recited in claim 14, wherein the step of using the logical zones to find one of the data sectors corresponding to the block address further comprises the steps of:
finding the logical zone corresponding to the block address;
finding the cluster within the logical zone corresponding to the block address;
finding the head within the cluster corresponding to the block address; and
finding the data track corresponding to the head and block address.

16. The method as recited in claim 15, wherein the step of using the logical zones to find one of the data sectors corresponding to the block address further comprises the step of finding the servo track and a radial offset from the servo track that correspond to the data track.

* * * * *